(12) United States Patent
Mages

(10) Patent No.: US 10,479,157 B2
(45) Date of Patent: Nov. 19, 2019

(54) RECEIVING ARRANGEMENT OF A SUPPORT SPRING FOR A SUSPENSION STRUT

(71) Applicants: THYSSENKRUPP BILSTEIN GMBH, Ennepetal (DE); thyssenkrupp AG, Essen (DE)

(72) Inventor: Stefan Mages, Hürth (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/773,343

(22) PCT Filed: Nov. 10, 2016

(86) PCT No.: PCT/EP2016/077250
§ 371 (c)(1),
(2) Date: May 3, 2018

(87) PCT Pub. No.: WO2017/081141
PCT Pub. Date: May 18, 2017

(65) Prior Publication Data
US 2018/0326806 A1 Nov. 15, 2018

(30) Foreign Application Priority Data
Nov. 13, 2015 (DE) .................. 10 2015 119 692

(51) Int. Cl.
*B60G 15/06* (2006.01)
*F16C 17/04* (2006.01)
(Continued)

(52) U.S. Cl.
CPC ............ *B60G 15/063* (2013.01); *F16C 17/04* (2013.01); *F16C 17/107* (2013.01); *F16C 19/10* (2013.01);
(Continued)

(58) Field of Classification Search
CPC ........ F16C 17/04; F16C 17/08; F16C 17/107; F16C 17/16; F16C 17/26; F16C 19/10;
(Continued)

(56) References Cited

U.S. PATENT DOCUMENTS

| 4,462,608 A | 7/1984 | Lederman |
| 6,286,820 B1 * | 9/2001 | Raulf .................... B60G 15/14 |
| | | 267/64.21 |

(Continued)

FOREIGN PATENT DOCUMENTS

| CN | 104 968 955 A | 10/2015 | |
| DE | 10219815 A1 * | 11/2003 | ........... B60G 15/063 |

(Continued)

OTHER PUBLICATIONS

English Translation of International Search Report issued in PCT/EP2016/077250, dated Jun. 2, 2017 (dated Jun. 13, 2017).

*Primary Examiner* — Marcus Charles
(74) *Attorney, Agent, or Firm* — thyssenkrupp North America, Inc.

(57) ABSTRACT

A receiving arrangement may be utilized by a lower end of a carrier spring on a damper tube of a shock absorber of a suspension strut, in particular for a vehicle. The receiving arrangement may include a bearing unit by way of which the damper tube can twist relative to the carrier spring about a longitudinal axis of the suspension strut. The bearing unit may include an upper bearing ring and a lower bearing ring, which bearing rings may be configured so they can slide on each other to form an axial bearing and a radial bearing between the carrier spring and the damper tube.

20 Claims, 2 Drawing Sheets

(51) Int. Cl.
*F16C 19/10* (2006.01)
*F16C 33/80* (2006.01)
*F16C 19/14* (2006.01)
*F16C 17/10* (2006.01)

(52) U.S. Cl.
CPC .............. *F16C 19/14* (2013.01); *F16C 33/80* (2013.01); *B60G 2204/1242* (2013.01); *B60G 2204/418* (2013.01); *F16C 2326/05* (2013.01)

(58) Field of Classification Search
CPC .......... F16C 19/14; F16C 33/74; F16C 33/80; F16C 2326/05; B60G 15/063; B60G 2204/418; B60G 2203/1242; Y10T 29/49643
USPC ............... 394/125, 129, 130, 144, 368, 420; 384/125, 129, 130, 144, 368, 420; 280/5, 280/51, 124.147, 124.151, 124.168; 267/221
See application file for complete search history.

(56) References Cited

U.S. PATENT DOCUMENTS

| | | | | |
|---|---|---|---|---|
| 6,918,701 | B2 * | 7/2005 | Ueno | F16C 17/10 384/125 |
| 8,066,435 | B2 * | 11/2011 | Miyata | B60G 15/068 280/124.147 |
| 8,517,357 | B2 * | 8/2013 | Chapman | F16F 9/0454 267/64.24 |
| 8,807,574 | B2 * | 8/2014 | Kohlhauser | B60G 15/063 267/221 |
| 8,882,357 | B2 * | 11/2014 | Morishige | F16C 17/04 384/139 |
| 9,091,297 | B2 * | 7/2015 | Morishige | F16C 17/04 |
| 2006/0163863 | A1 * | 7/2006 | Ellmann | B60G 15/063 280/788 |
| 2010/0104228 | A1 * | 4/2010 | Kaneko | B60G 15/068 384/420 |
| 2011/0140323 | A1 | 6/2011 | Kwon | |
| 2011/0262070 | A1 * | 10/2011 | Zernickel | B60G 15/068 384/618 |
| 2013/0256070 | A1 * | 10/2013 | Murakami | F16F 9/185 188/315 |
| 2014/0084555 | A1 * | 3/2014 | Murakami | B60G 13/08 280/5.514 |
| 2016/0319897 | A1 * | 11/2016 | Mochizuki | F16F 9/096 |

FOREIGN PATENT DOCUMENTS

| | | | |
|---|---|---|---|
| DE | 10 2009 014 986 A | 10/2009 | |
| DE | 10 2009 011 669 A | 11/2009 | |
| DE | 10 2008 057 590 A | 2/2010 | |
| DE | 10 2010 036242 A | 3/2012 | |
| EP | 0 656 483 A | 6/1995 | |
| EP | 2 128 464 A | 12/2009 | |
| EP | 2 258 962 A | 12/2010 | |
| EP | 2264331 A | 12/2010 | |
| EP | 2924315 A1 * | 9/2015 | ........... B60G 15/062 |
| JP | 2002139087 A | 5/2002 | |
| KR | 2019970041738 U | 7/1999 | |

* cited by examiner

RECEIVING ARRANGEMENT OF A SUPPORT SPRING FOR A SUSPENSION STRUT

CROSS REFERENCE TO RELATED APPLICATIONS

This application is a U.S. National Stage Entry of International Patent Application Serial Number PCT/EP2016/077250, filed Nov. 10, 2016, which claims priority to German Patent Application No. DE 10 2015 119 692.1, filed Nov. 13, 2015, the entire contents of both of which are incorporated herein by reference.

FIELD

The present disclosure generally relates to suspensions of motor vehicles, including receiving arrangements of lower ends of carrier springs on damper tubes of shock absorbers of suspension struts in vehicles.

BACKGROUND

Usually, a so-called strut bearing is placed on the top side of the carrier spring so that this rests with the lower end twist-resistantly on the damper tube, and so that the carrier spring can twist relative to the vehicle superstructure via the top strut bearing. This however complicates the top structure of the suspension strut.

As an example, EP 2 128 464 B1 discloses a strut bearing for rotatably receiving a carrier spring at the upper end of the suspension strut. The strut bearing is here based on plain bearing elements for radial and axial support of the carrier spring.

KR 20-1997-0041738 A1 discloses a receiving arrangement of a lower end of a carrier spring on a damper tube of a shock absorber of a suspension strut which may be used for a vehicle. The receiving arrangement has a bearing unit with roller bodies, by means of which the damper tube can twist relative to the carrier spring about a longitudinal axis of the suspension strut. The roller bearing here serves to receive axial forces and is configured with a very large diameter so as to avoid a tilting of the carrier spring. A reliable operation of the receiving arrangement of the carrier spring on the damper tube is not in principle guaranteed, in particular when the suspension strut is not under load. Furthermore, on greater compression of the suspension strut, tilt moments may occur in the carrier spring which also cannot be absorbed via the axial bearing without additional radial bearing components.

Thus a need exists for a receiving arrangement of a lower end of a carrier spring on a damper tube of a shock absorber of a suspension strut that allows improved support of the carrier spring on the damper tube. A need also exists to produce the receiver arrangement compactly and as simply and cheaply as possible.

DETAILED DESCRIPTION

Figure 1:
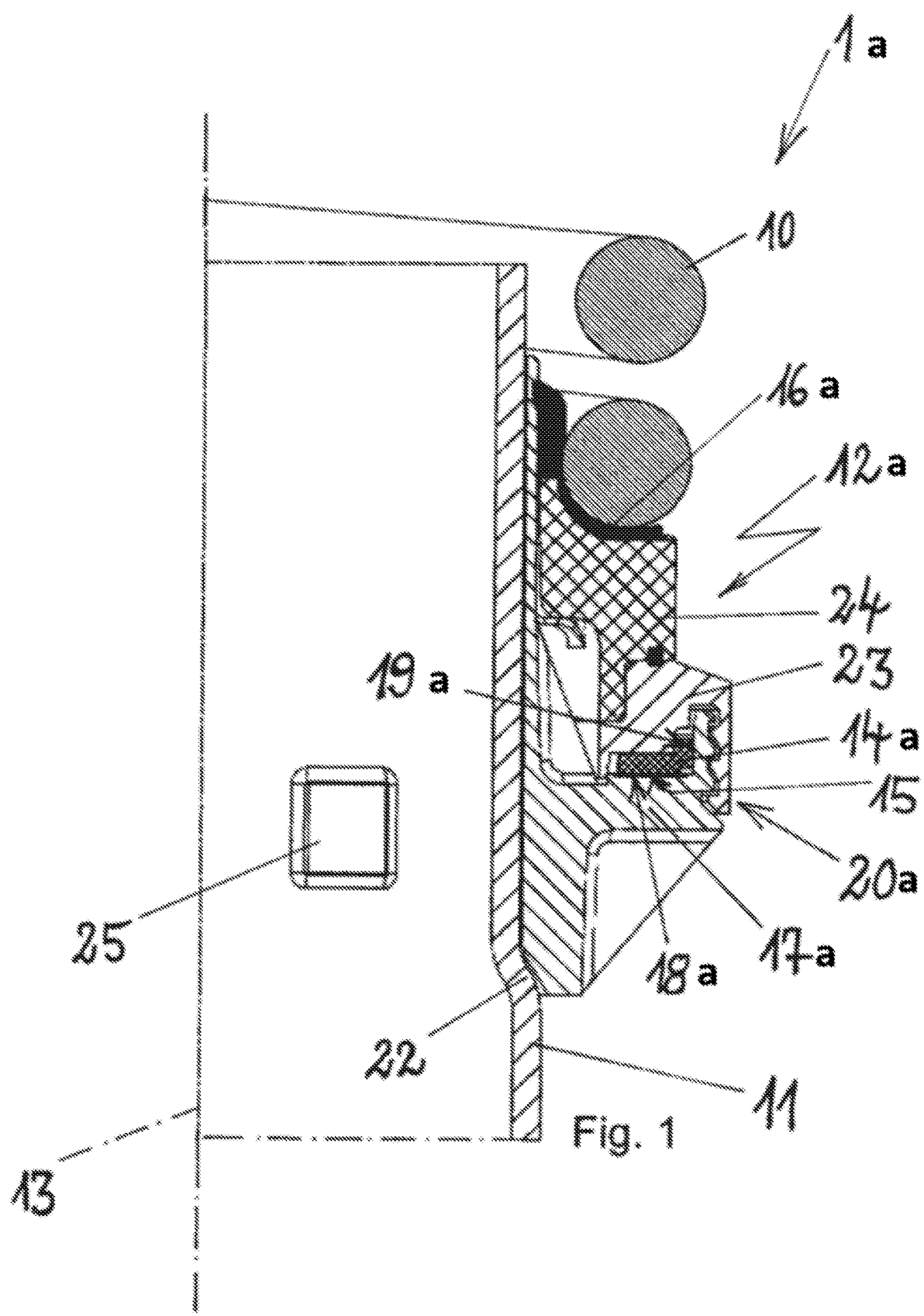
FIG. 1 is a side sectional view of an example receiving arrangement of a carrier spring on a damper tube.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns receiving arrangements of a lower end of a carrier spring on a damper tube of a shock absorber of a suspension strut, which may be used, for example, for a vehicle. In some examples, the receiving arrangement may comprise a bearing unit by way of which the damper tube can twist relative to the carrier spring about a longitudinal axis of the suspension strut.

In some cases, the bearing unit may comprise an upper bearing ring and a lower bearing ring, which bearing rings are configured so they can slide on each other to form an axial bearing and a radial bearing between the carrier spring and the damper tube.

The core of the present disclosure is the formation of the bearing unit as a plain bearing unit with an axial bearing to support axial forces along the longitudinal axis of the suspension strut, and with a radial bearing to support forces acting perpendicular to the direction of the longitudinal axis. The plain bearing unit may be designed simply and compactly, and allows the damper tube to twist relative to the carrier spring. Also, a piston structure with a piston rod inside the damper tube may also be received twist-resistantly with the carrier spring at the upper end of the suspension strut, so that the damper tube adjacent to the stub axle can twist in the plain bearing unit. The twistability of the damper tube relative to the vehicle superstructure is important on steering deflections, in particular on the front axle of a motor vehicle, and if the carrier spring with the upper connecting end of the suspension strut can be rigidly connected to the vehicle superstructure, the design structure of the upper end of the suspension strut is simplified. As a whole, the plain bearing unit between the carrier spring and the damper tube may be configured more simply than a bearing unit between the carrier tube and the upper end of the suspension strut, for example a suspension strut cup. The advantage lies in particular in that the bearing unit, in the design a plain bearing unit with a radial and an axial bearing component, may have a diameter which is only slightly greater than the diameter of the damper tube. Furthermore, a plain bearing unit is easy to construct from a plurality of ring elements guided over the damper tube until finally the carrier spring can be placed on the bearing unit.

With a small bearing diameter, which is possible in particular by the choice of a plain bearing, smaller friction moments occur, whereby a further advantage is formed. The disadvantage of the principle of plain bearings, with a high friction, high breakaway forces and hence a poor steering feedback in McPherson applications, is significantly compensated by the design with generally small radii. The effective lever arm of the relevant friction forces, thus reduced to a minimum, is kept small.

According to an advantageous refinement of the receiving arrangement, a spring seat is provided on which the lower end of the carrier spring sits, and the upper bearing ring is arranged twist-resistantly on the spring seat. The spring seat configured as an individual component allows the choice of an alternative material to that of the upper bearing ring, and in particular there is an advantage if the spring seat is configured as a soft component which achieves a noise reduction because of its elastic yielding properties.

Further advantageously, a supporting ring is provided which sits on the damper tube, and the lower bearing ring is arranged twist-resistantly on the supporting ring. Particularly advantageously, the lower bearing ring is made from a material which differs from the material of the supporting ring. The supporting ring may for example comprise a steel material, while the lower bearing ring may comprise a non-ferrous metal. In particular, the damper tube may have a supporting shoulder against which the supporting ring sits to absorb axial forces in the direction of the longitudinal axis. The supporting ring may here be pressed onto the damper tube, or alternatively or additionally the supporting ring is connected by substance bonding to the damper tube. In particular, it must be ensured that the supporting ring and with it the lower bearing ring cannot twist on the damper tube.

Furthermore, the connection of the lower bearing ring to the supporting ring is configured such that the lower bearing ring cannot twist on the supporting ring. For example, the lower bearing ring is glued to the supporting ring or otherwise connected thereto by form fit and/or material bonding.

According to an advantageous refinement of the receiving arrangement, the lower bearing ring is configured as a shoulder plain bearing and has an L-shaped cross-sectional profile, wherein the horizontal base leg of the cross-sectional profile forms the axial bearing and wherein an upright leg of the cross-sectional profile forms the radial bearing. This achieves the advantage that with a one-piece lower bearing ring only, both the axial bearing and the radial bearing can be formed. Furthermore, advantages result in the receiving of the lower bearing ring on the supporting ring. The upper bearing ring may be adapted to the L-shaped contour of the lower bearing ring, so that the complementary bearing counterpart on the upper bearing ring also forms the axial bearing and the radial bearing. The upper bearing ring is here in particular also formed as one piece. Furthermore advantageously, the materials of the upper bearing ring and lower bearing ring differ from each other.

A further advantage is achieved if the upper bearing ring seals in slip fashion against the outside of the damper tube. For this, the upper bearing ring may have on the inside a coating, a seal recess or similar, and the slipping seal of the upper bearing ring against the outside of the damper tube prevents contaminants from penetrating into the bearing gap between the two bearing rings. Furthermore advantageously, a labyrinth seal is formed between the upper bearing ring and the supporting ring on the outside for the arrangement of the lower bearing ring. In this way, the lower bearing ring and hence the axial bearing and the radial bearing are enclosed between two seals, which are formed on the outside by the labyrinth seal and on the inside by the slipping seal of the upper bearing ring against the damper tube.

Furthermore, it is advantageous if the supporting ring has a radial carrier portion which extends to between the upper bearing ring and the damper tube, and on which the upright leg of the cross-sectional profile of the lower bearing ring rests radially inwardly to form the radial bearing. In this way, an embodiment variant of the radial bearing is formed, and the lower bearing ring need not reach up to the damper tube with its L shape. Rather, the possibility exists of configuring the supporting ring with the radial carrier portion, so that the lower bearing ring can lie with the upright leg on the outer casing surface of the carrier portion, and the lower bearing ring lies with the base leg on a surrounding planar face of the supporting ring. Overall, this gives a simple configuration of the bearing unit as a plain bearing with an axial and a radial bearing component, and before assembly the upper bearing ring can already be connected to the spring seat, and the lower bearing ring can already be connected to the supporting ring. During installation, the supporting ring with the lower bearing ring is placed on the damper tube and then, to form the bearing unit, the spring seat with the upper bearing ring is pushed onto the damper tube until the bearing unit is formed completely.

The present disclosure furthermore concerns a suspension strut for a motor vehicle with a receiving arrangement of a lower end of a carrier spring on a damper tube of the suspension strut, wherein the receiving arrangement comprises a bearing unit by means of which the damper tube can twist relative to the carrier spring about a longitudinal axis of the suspension strut. According to the present disclosure, the bearing unit comprises an upper bearing ring and a lower bearing ring, which bearing rings are configured so they can slide on each other to form an axial bearing and a radial bearing between the carrier spring and the damper tube. The further features and associated advantages of the receiving arrangement also apply to the suspension strut according to the present disclosure.

FIG. 1 shows, in a half side view, an arrangement 1*a* for receiving a lower end of a carrier spring 10 on a damper tube 11 of a shock absorber of a suspension strut, which may be used for example in a suspension of a vehicle. The receiving arrangement 1*a* comprises a bearing unit 12*a*, by means of which the damper tube 11 can twist relative to the carrier spring 10 about a longitudinal axis 13 of the suspension strut. The longitudinal axis 13 forms the axis of symmetry of the damper tube 11 and substantially also the axis of symmetry of the bearing unit 12*a*.

The bearing unit 12*a* has an upper bearing ring 14*a* and a lower bearing ring 15, which bearing rings 14*a*, 15 slide on each other when the carrier spring 10 is twisted relative to the damper tube 11 about the longitudinal axis 13. To form an axial bearing 18*a*, the upper bearing ring 14*a* has a base leg, and to form a radial bearing 19*a*, an upright leg. The upper bearing ring 14*a* is here adapted to a groove-like inner contour of a supporting ring 17*a* which, with an inner face, forms the counterpart of the radial bearing 19*a*, wherein the lower bearing ring 15 forms the counterpart of the axial bearing 18*a* and hence lies below the base leg.

The upper bearing ring 14*a* is arranged twist-resistantly on an intermediate ring 23, and above the intermediate ring 23 is a receiver ring 24 on which a spring seat 16*a* sits, and the carrier spring 10 rests on the spring seat 16*a*. The spring seat 16*a* is made of a soft component, and the receiver ring 24 is made of a damping plastic material which provides vibration-damping and noise-damping properties for the bearing unit 12*a*, so the materials of the upper bearing ring 14*a* and spring seat 16*a*, and of the intermediate ring 23 and the receiver ring 24, differ from each other.

The lower bearing ring 15 is formed as a disk and received twist-resistantly on the supporting ring 17*a*, and the bearing ring 15 is formed for example by a steel disk. The supporting ring 17*a* sits on a supporting shoulder 22 of the damper tube 11 so that a form fit is created in the direction of the longitudinal axis, and so that axial forces of the carrier spring 10 are transmitted securely to the damper tube 11 via the supporting ring 17*a*. In the damper tube 11, as an example a molding 25 is shown which prevents a twisting of the supporting ring 17*a* on the damper tube 11, wherein the molding 25 may be formed as multiple moldings on the circumference of the damper tube 11.

Between a holding strip, formed on the intermediate ring 23 and pointing downward, and an outer region of the supporting ring 17*a*, a labyrinth seal 20*a* is formed which prevents the penetration of moisture and contaminants; it also prevents the escape of lubricant from the bearing region of the axial bearing 18*a* and radial bearing 19*a*.

Figure 2:
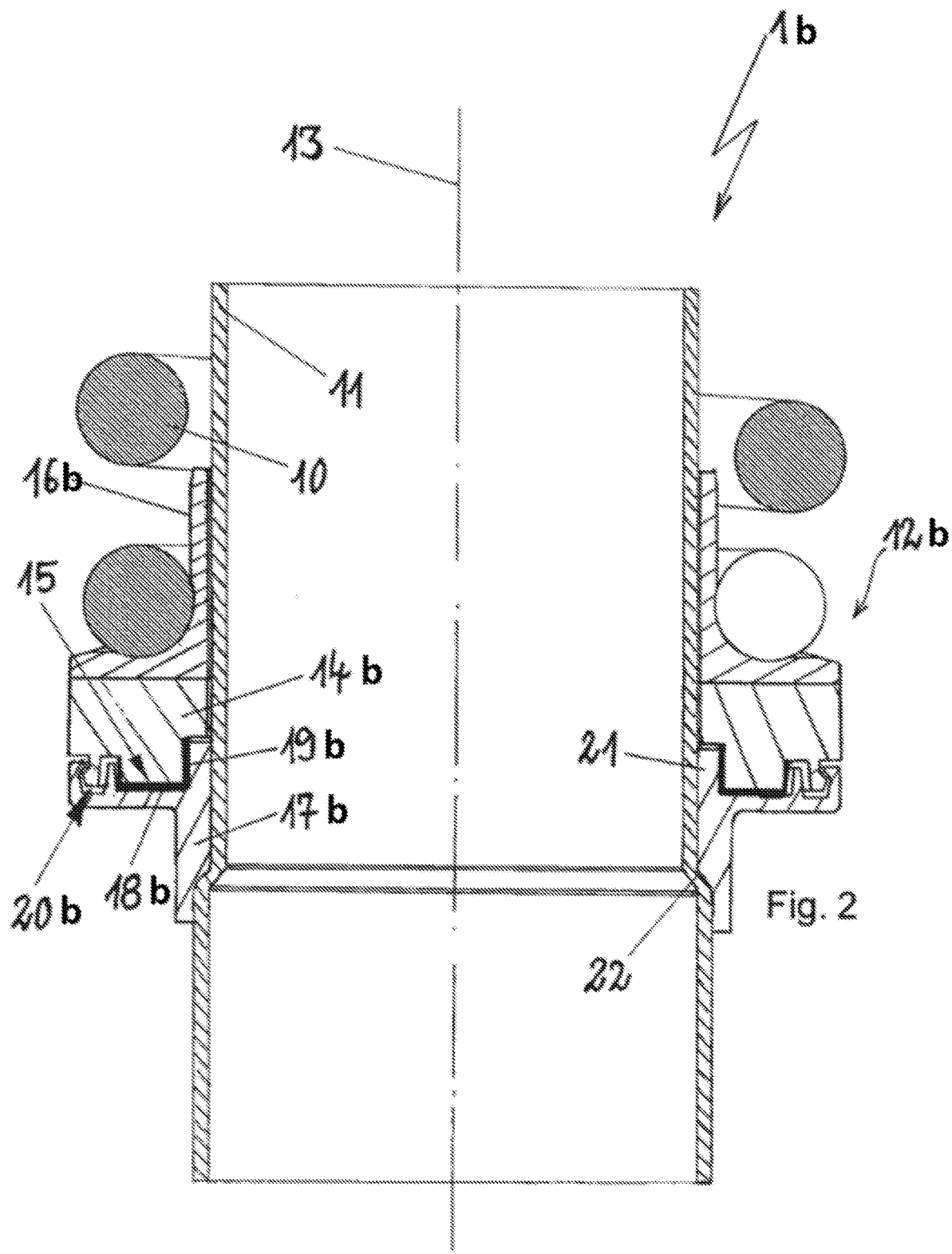
FIG. 2 is a side sectional view of another example receiving arrangement of a carrier spring on a damper tube.

FIG. 2 shows a detailed exemplary embodiment of a receiving arrangement 1*b* with a bearing unit 12*b* which, according to the present disclosure, is configured as a plain bearing unit and comprises an axial bearing 18*b* and a radial bearing 19*b*. The axial bearing 18*b* and the radial bearing 19*b* are formed by a one-piece lower bearing ring 15 which sits in the supporting ring 17*b*. The complementarily formed upper bearing ring 14*b* is connected to a spring seat 16*b*, against which the carrier spring 10 rests. A supporting shoulder 22 in the damper tube 11 is also shown, on which the supporting ring 17*b* sits by form fit.

The upper bearing ring 14*b* and the supporting ring 17*b* form a labyrinth seal 20*b* around the outside, extending to the lower bearing ring 15 and preventing the penetration of contaminants and moisture into the gap between the upper bearing ring 14*b* and the lower bearing ring 15. On the inside, the upper bearing ring 14*b* is configured so as to seal, in a manner not shown in detail, against the outside of the damper tube 11, for example by means of a coating or similar such that, despite the seal, the upper bearing ring 14*b* can still twist on the damper tube 11. This also prevents the penetration of contaminants between the upper bearing ring 14*b* and the damper tube 11 into the slip gap between the bearing rings 14*b* and 15.

The supporting ring 17*b* has a radial carrier portion 21 which extends to between the upper bearing ring 14*b* and the damper tube 11, and on which the upright leg of the cross-sectional profile of the lower bearing ring rests inwardly to form the radial bearing 19*b*. The material of the supporting ring 17*b* here differs from the material of the lower bearing ring 15, and the lower bearing ring 15 is pressed and/or glued for example into the pocket-like circumferential recess in the supporting ring 17*b*. For example, the upper bearing ring 14*b* is formed by a plastic component, and for example the lower bearing ring is formed by a metal component based on a non-ferrous alloy.

The present disclosure is not restricted in its embodiment to the preferred exemplary embodiment described above. Rather, a plurality of variants is conceivable which make use of the solution shown even with embodiments of different types. All features and/or advantages arising from the claims, the description or the drawings, including design details or spatial arrangements, may be essential to the present disclosure both alone and in widely varying combinations.

LIST OF REFERENCE SIGNS

1*a*, 1*b* Receiving arrangements
10 Carrier spring
11 Damper tube
12*a*, 12*b* Bearing units
13 Longitudinal axis
14*a*, 14*b* Upper bearing rings
15 Lower bearing ring
16*a*, 16*b* Spring seats
17*a*, 17*b* Supporting rings
18*a*, 18*b* Axial bearings
19*a*, 19*b* Radial bearings
20*a*, 20*b* Labyrinth seals
21 Radial carrier portion
22 Supporting shoulder
23 Intermediate ring
24 Receiver ring
25 Molding

What is claimed is:

1. A receiving arrangement of a lower end of a carrier spring on a damper tube of a shock absorber of a suspension strut, the receiving arrangement comprising a bearing unit by way of which the damper tube twists relative to the carrier spring about a longitudinal axis of the suspension strut, the bearing unit comprising an upper bearing ring and a lower bearing ring that are configured to slide on each other to form an axial bearing and a radial bearing between the carrier spring and the damper tube, wherein the lower bearing ring is configured as a shoulder plain bearing and has an L-shaped cross-sectional profile, wherein a horizontal base leg of the L-shaped cross-sectional profile forms the axial bearing, wherein an upright leg of the L-shaped cross-section profile forms the radial bearing.

2. The receiving arrangement of claim 1 comprising a spring seat on which the lower end of the carrier spring sits, wherein the upper bearing ring is disposed twist-resistantly on the spring seat.

3. The receiving arrangement of claim 2 comprising a supporting ring that sits on the damper tube, wherein the lower bearing ring is disposed twist-resistantly on the supporting ring.

4. The receiving arrangement of claim 2 wherein the spring seat is configured as a soft component with elastic yielding properties that reduce noise.

5. The receiving arrangement of claim 1 wherein the upper bearing ring seals in slip fashion against an outside of the damper tube.

6. The receiving arrangement of claim 1 comprising a supporting ring that sits on the damper tube, wherein the lower bearing ring is disposed twist-resistantly on the supporting ring.

7. The receiving arrangement of claim 6 wherein a labyrinth seal is formed between the upper bearing ring and the supporting ring on an outside for arrangement of the lower bearing ring.

8. A suspension strut for a vehicle with a receiving arrangement of a lower end of a carrier spring on a damper tube of the suspension strut, the receiving arrangement comprising a bearing unit by way of which the damper tube twists relative to the carrier spring about a longitudinal axis of the suspension strut, wherein the bearing unit comprises an upper bearing ring and a lower bearing ring that are configured to slide on each other to form an axial bearing and a radial bearing between the carrier spring and the damper tube, wherein the receiving arrangement comprises a supporting ring that sits on the damper tube, wherein the lower bearing ring is disposed twist-resistantly on the supporting ring, wherein the supporting ring has a radial carrier portion that extends to between the upper bearing ring and the damper tube, wherein an upright leg of a cross-sectional profile of the lower bearing ring rests radially inwardly on the radial carrier portion to form the radial bearing.

9. The suspension strut of claim 8 wherein the receiving arrangement comprises a spring seat on which the lower end of the carrier spring sits, wherein the upper bearing ring is disposed twist-resistantly on the spring seat.

10. The suspension strut of claim 9 wherein the receiving arrangement comprises a supporting ring that sits on the damper tube, wherein the lower bearing ring is disposed twist-resistantly on the supporting ring.

11. The suspension strut of claim 9 wherein the spring seat is configured as a soft component with elastic yielding properties that reduce noise.

12. The suspension strut of claim 8 wherein the lower bearing ring is configured as a shoulder plain bearing and has an L-shaped cross-sectional profile, wherein a horizontal base leg of the L-shaped cross-sectional profile forms the axial bearing, wherein an upright leg of the L-shaped cross-section profile forms the radial bearing.

13. The suspension strut of claim 8 wherein the upper bearing ring seals in slip fashion against an outside of the damper tube.

14. The suspension strut of claim 8 wherein a labyrinth seal is formed between the upper bearing ring and the supporting ring on an outside for arrangement of the lower bearing ring.

15. A receiving arrangement of a lower end of a carrier spring on a damper tube of a shock absorber of a suspension strut, the receiving arrangement comprising a bearing unit by way of which the damper tube twists relative to the carrier spring about a longitudinal axis of the suspension strut, the bearing unit comprising an upper bearing ring and a lower bearing ring that are configured to slide on each other to form an axial bearing and a radial bearing between the carrier spring and the damper tube, wherein the receiving arrangement comprises a supporting ring that sits on the damper tube, wherein the lower bearing ring is disposed twist-resistantly on the supporting ring, wherein the supporting ring has a radial carrier portion that extends to between the upper bearing ring and the damper tube, wherein an upright leg of a cross-sectional profile of the lower bearing ring rests radially inwardly on the radial carrier portion to form the radial bearing.

16. The receiving arrangement of claim 15 wherein a labyrinth seal is formed between the upper bearing ring and the supporting ring on an outside for arrangement of the lower bearing ring.

17. The receiving arrangement of 16 wherein the upper bearing ring seals in slip fashion against an outside of the damper tube.

18. The receiving arrangement of claim 15 comprising a spring seat on which the lower end of the carrier spring sits, wherein the upper bearing ring is disposed twist-resistantly on the spring seat.

19. The receiving arrangement of claim 18 comprising a supporting ring that sits on the damper tube, wherein the lower bearing ring is disposed twist-resistantly on the supporting ring.

20. The receiving arrangement of claim 18 wherein the spring seat is configured as a soft component with elastic yielding properties that reduce noise.

* * * * *